United States Patent [19]

Gross et al.

[11] 4,319,457

[45] Mar. 16, 1982

[54] HYDRO-PNEUMATIC BRAKE CYLINDER DEVICE FOR MOTOR VEHICLE BRAKE SYSTEMS

[75] Inventors: Friedrich Gross, Seelze; Guenther Meise, Hanover; Herbert Unger, Springe, all of Fed. Rep. of Germany

[73] Assignee: WABCO Fahrzeugbremsen GmbH, Hanover, Fed. Rep. of Germany

[21] Appl. No.: 136,239

[22] Filed: Apr. 1, 1980

[30] Foreign Application Priority Data

Apr. 3, 1979 [DE] Fed. Rep. of Germany ....... 2913265

[51] Int. Cl.³ ............................................. F15B 15/18
[52] U.S. Cl. ........................................ 60/593; 60/589
[58] Field of Search ......................... 60/583, 593, 589; 92/129

[56] References Cited

U.S. PATENT DOCUMENTS

| | | | |
|---|---|---|---|
| 1,939,889 | 12/1933 | Fralich | 92/129 |
| 2,767,548 | 10/1956 | Ayers, Jr. | 60/589 |
| 2,880,584 | 4/1959 | French | 60/589 |
| 3,777,496 | 12/1973 | Mizusawa | 60/593 |
| 4,201,057 | 5/1980 | Martin | 60/593 |

FOREIGN PATENT DOCUMENTS

46-11857  3/1971  Japan .................................. 60/593

*Primary Examiner*—Abraham Hershkovitz
*Attorney, Agent, or Firm*—G. J. Falce

[57] ABSTRACT

In a mixed medium brake system for a motor vehicle, there is provided a hydro-pneumatic brake cylinder device in a common housing having a compact configuration that is realized by designing the hydraulic piston in the form of a cylindrical plunger having a hollow cavity in the end adjacent the pneumatic piston, whereby engagement of the pneumatic piston push rod with the plunger is at a location thereof forward of the end adjacent the pneumatic piston, thus minimizing the distance required between the pneumatic piston and the hydraulic piston formed by the plunger. Such an arrangement also reduces the binding action of the cylindrical plunger in its guide bore for improved operation, while accommodating pivotal motion of said pneumatic piston.

7 Claims, 1 Drawing Figure

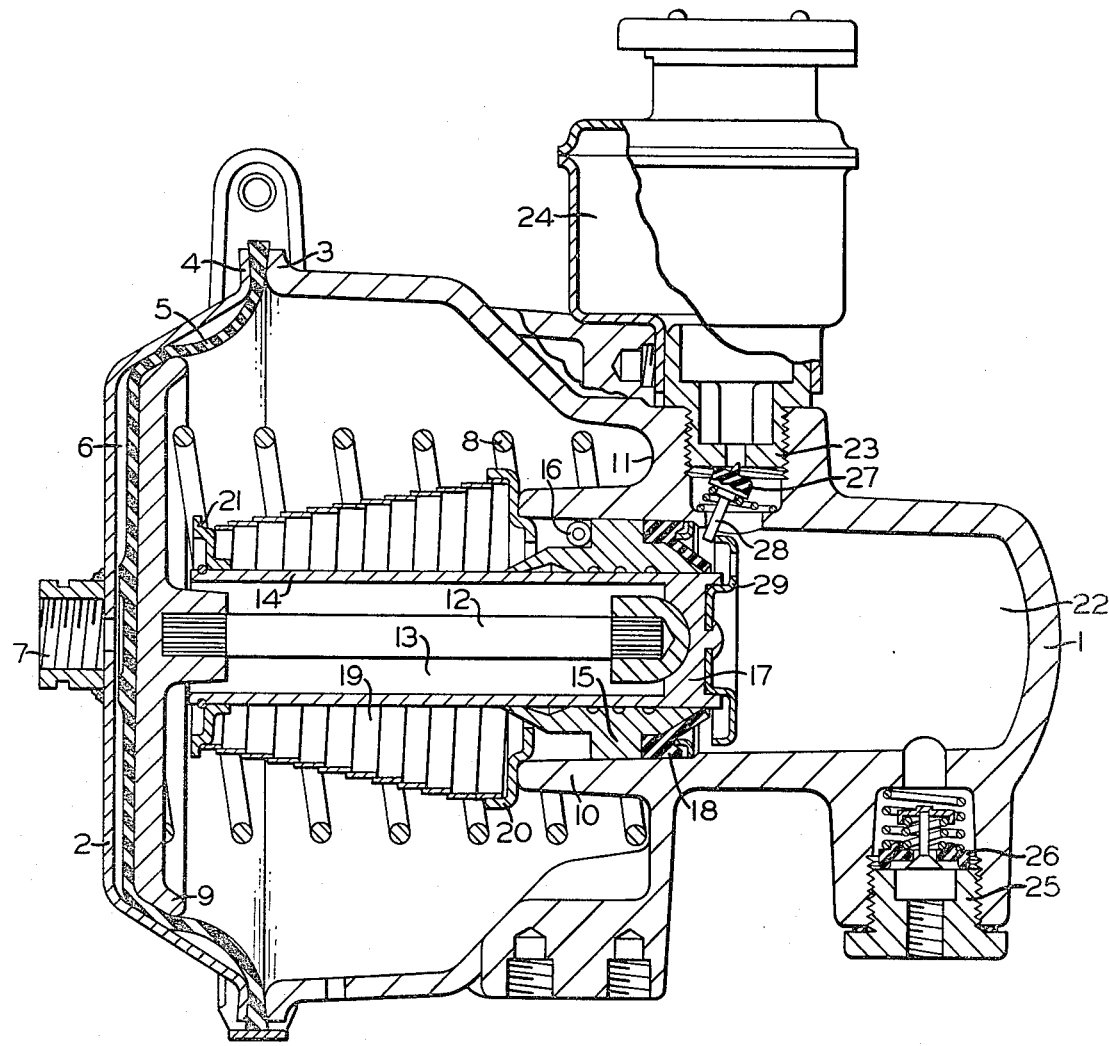

HYDRO-PNEUMATIC BRAKE CYLINDER DEVICE FOR MOTOR VEHICLE BRAKE SYSTEMS

BACKGROUND OF THE INVENTION

The invention concerns a brake cylinder device for motor vehicles employing combined pneumatic-hydraulic brake systems.

Such brake cylinder devices are used for power braking control in motor vehicle brake systems with mixed transmitting media, in which a pneumatic pressurizing cylinder is used in combination with a hydraulic transmitting cylinder for pressure transmission, and the transmitting cylinder sends the hydraulic pressure into the wheel cylinder, the forces of which are converted to mechanical movement so as to activate the wheel brakes.

In present designs, the pressurizing cylinder is similar to a diaphragm or a piston cylinder of a pneumatic type vehicle brake system, and the transmitter cylinder is similar to a master cylinder in a hydraulic type vehicle brake system. The housings of the two cylinders are flanged together in the direction of motion of the piston, and a push rod provides a mechanical connection between the diaphragm or piston of the pneumatic pressurizing cylinder and the piston or plunger of the hydraulic transmitter cylinder.

The design of this braking device, however, entails a relatively lengthened construction, so that its installation causes difficulty because of the small amount of available space. The production costs are also high because two separate braking devices must be manufactured, which ultimately perform the braking function of only one braking device within the combined brake system.

SUMMARY OF THE INVENTION

The object of the present invention is to devise a combined pneumatic-hydraulic brake cylinder device having a compact construction that is economical to manufacture and offers long service life.

The telescoping arrangement of the two cylinders affords the possibility of a single-piece, compact housing, which offers the great advantage of assembly of all components from one side. Another advantage is obviously that the pneumatic piston push rod is no longer engaged with the back end of the hydraulic piston or plunger; inserted through a hollow cavity of the hydraulic piston or plunger for engagement therewith at a point near its front end; that is, the piston or plunger is driven by the push rod at a point near the front end instead of being pushed from the rear end. The advantages achieved in this way are based on the fact that the tilting forces imposed on the hydraulic plunger by the push rod during braking action are reduced, and the guide of the plunger can therefore be shorter. Furthermore, the dynamic seals, guides and plunger contact surfaces undergo less stress, and hence less wear.

BRIEF DESCRIPTION OF THE DRAWINGS

The invention shall now be described in detail on the basis of an exemplified embodiment which, in the drawing, represents a brake control device consisting of a pressurizing cylinder and a transmitter cylinder; the pressurizing part consists of a diaphragm, and a plunger generates the hydraulic pressure in its transmitter part.

DESCRIPTION AND OPERATION

The brake cylinder device consists essentially of an open housing 1 and a cover 2 that seals off this opening and cooperates with a pot-shaped diaphragm 5 clamped between connection flanges 3 and 4 of the housing 1 to form a chamber 6 to which compressed air is applied via a connection piece 7 in the cover 2.

A return spring 8 is maintained under slight tension between a piston plate 9 lying against diaphragm 5 and a radial recess 11 in housing 1 formed by a housing cross-piece 10, thereby supporting diaphragm piston 5/9 in the direction of motion during application of compressed air to chamber 6.

A push rod 12 is connected with piston plate 9 and penetrates the cavity 13 of a hollow cylindrical plunger 14, whose guide is provided by a guide box 15 that is secured in position by clamping sleeves 16. The connection between the diaphragm piston 5/9 and the plunger 14 is provided by the push rod 12 penetrating the plunger 14, with the free end of the push rod being spherically shaped for engagement in a corresponding socket at the closed end 17 of the plunger facing away from diaphragm piston 5/9. The push rod is thus pivotable at its point of engagement with plunger 14 to accommodate slight misalignment of diaphragm piston 5/9 in cover 2.

The dynamic sealing of the plunger 14 is provided by a sealing ring 18 arranged on the guide box 15; this sealing ring also provides the static seal between the housing cross-piece 10 and the guide box 15 or plunger 14.

A telescopic spring 19, is arranged between the guide box 15 and the free end of plunger 14 facing the piston plate 9, and the position of this telescopic spring 19 is fixed under slight tension between a spring washer 20 lying against the housing cross-piece 10 and a spring washer 21 secured on the outside diameter of the plunger 14 at its end facing diaphragm 5. The telescopic spring 19 serves to return plunger 14 to its release position with piston plate 9 during release of a brake application, and also prevents dirt from the chamber of spring 8 from penetrating onto the running surface of plunger 14.

The front end 17 of plunger 14, together with the sealing ring 18, delimits a hydraulic chamber 22 surrounded by housing 1, which chamber possesses a connection piece 23 for a pressure-fluid header tank 24 and a connection piece 25 for the wheel cylinder (not shown) of the individual wheel brakes, and a bottom valve 26 is arranged in a connection piece 25.

A rocker valve 27 arranged in connection piece 23 of the header tank is connected with its tappet 28 penetrating chamber 22 with a disk 29 attached to the end of plunger 14, so that the rocker valve 27 is open in the release position of plunger 14.

The function of the brake cylinder device is as follows: Compressed air supplied to chamber 6 via connection 7 when the driver applies the brake builds up pressure in this chamber 6, which triggers motion of the diaphragm 5 against the force of spring 8. This motion is transmitted to plunger 14 via push rod 12, so that plunger 14, overcoming the force of the telescopic spring 19, travels into chamber 22 and simultaneously closes rocker valve 27. The volume of hydraulic fluid displaced in this way travels into the receiver cylinders of the wheel brakes via bottom valve 26 in connection 25, building up pressure as it does so.

When the brakes are released, the hydraulic brake pressure decreases to the supply pressure maintained by the bottom valve 26.

The fact that push rod 12 is engageable with plunger 14 at its front end, by reason of the cavity 13, rather than at its rear end provides for a more compact construction, and further applies the force of the pneumatic piston in the area of the plunger encircled by the guide box 15. This reduces the binding tendency of the plunger 14, so that its guide length may be shortened and an increased service life of the guide box seals may be realized.

Having thus described the invention, what we claim as new and desire to secure by Letters Patent, is:

1. A hydro-pneumatic brake cylinder device having a pneumatic cylinder and a hydraulic cylinder comprising a fluid pressure chamber combined in a common housing with an open end; a guide member secured in said housing between said hydraulic and pneumatic cylinders and having a guide bore therein; a hydraulic piston operatively disposed in said guide bore and having a closed end projecting into said fluid pressure chamber of said hydraulic cylinder; a pneumatic piston operatively disposed in said pneumatic cylinder and engageable with said hydraulic piston; a cover closing said open end of said housing and defining in cooperation with said pneumatic piston a pressure chamber; an inlet at said cover via which compressed air is supplied to said pressure chamber to actuate said pneumatic piston in a brake application direction; and an outlet at said hydraulic cylinder via which hydraulic fluid is transmitted in response to actuation of said hydraulic piston by said pneumatic piston; wherein the improvement comprises:

(a) said hydraulic piston being a cylindrical plunger having a cavity formed in the end opposite said closed end, wherein the bottom of said cavity is formed with a spherically-shaped recess that lies in a plane that intersects the periphery of said plunger within the area thereof encircled by said guide bore; and (b) said pneumatic piston having a push rod with a spherically-shaped end engageable with said spherically-shaped recess in said bottom of said cavity to provide said engagement between said pneumatic and hydraulic pistons and to accommodate pivotal motion of said pneumatic piston.

2. A hydro-pneumatic brake cylinder device as recited in claim 1, further characterized in that said push rod has abutting engagement with said bottom of said cavity.

3. A hydro-pneumatic brake cylinder device as recited in claim 1, further comprising means for biasing said plunger in a direction opposite said brake application direction.

4. A hydro-pneumatic brake cylinder device as recited in claim 4, wherein said bias means comprises a spring arranged between said housing and said opposite end of said plunger.

5. A hydro-pneumatic brake cylinder device as recited in claim 4, further characterized in that said spring is a telescopic spring that encircles said plunger in said pneumatic cylinder, so as to enclose said plunger.

6. A hydro-pneumatic brake cylinder device as recited in claim 5, further comprising a return spring acting on said pneumatic piston in a direction opposite said brake application direction.

7. A hydro-pneumatic brake cylinder device as recited in claim 1, wherein said guide member includes seal means for providing a static seal with said housing and a dynamic seal with said plunger.

* * * * *

UNITED STATES PATENT AND TRADEMARK OFFICE
CERTIFICATE OF CORRECTION

PATENT NO. : 4,319,457
DATED : March 16, 1982
INVENTOR(S) : Friedrich Gross, Guenther Meise, Herbert Unger It is certified that error appears in the above-identified patent and that said Letters Patent are hereby corrected as shown below:

Column 4, line 21, delete "4" and insert --3--

Signed and Sealed this

Second Day of November 1982

[SEAL]

Attest:

GERALD J. MOSSINGHOFF

Attesting Officer     Commissioner of Patents and Trademarks